United States Patent Office 3,337,909
Patented Aug. 29, 1967

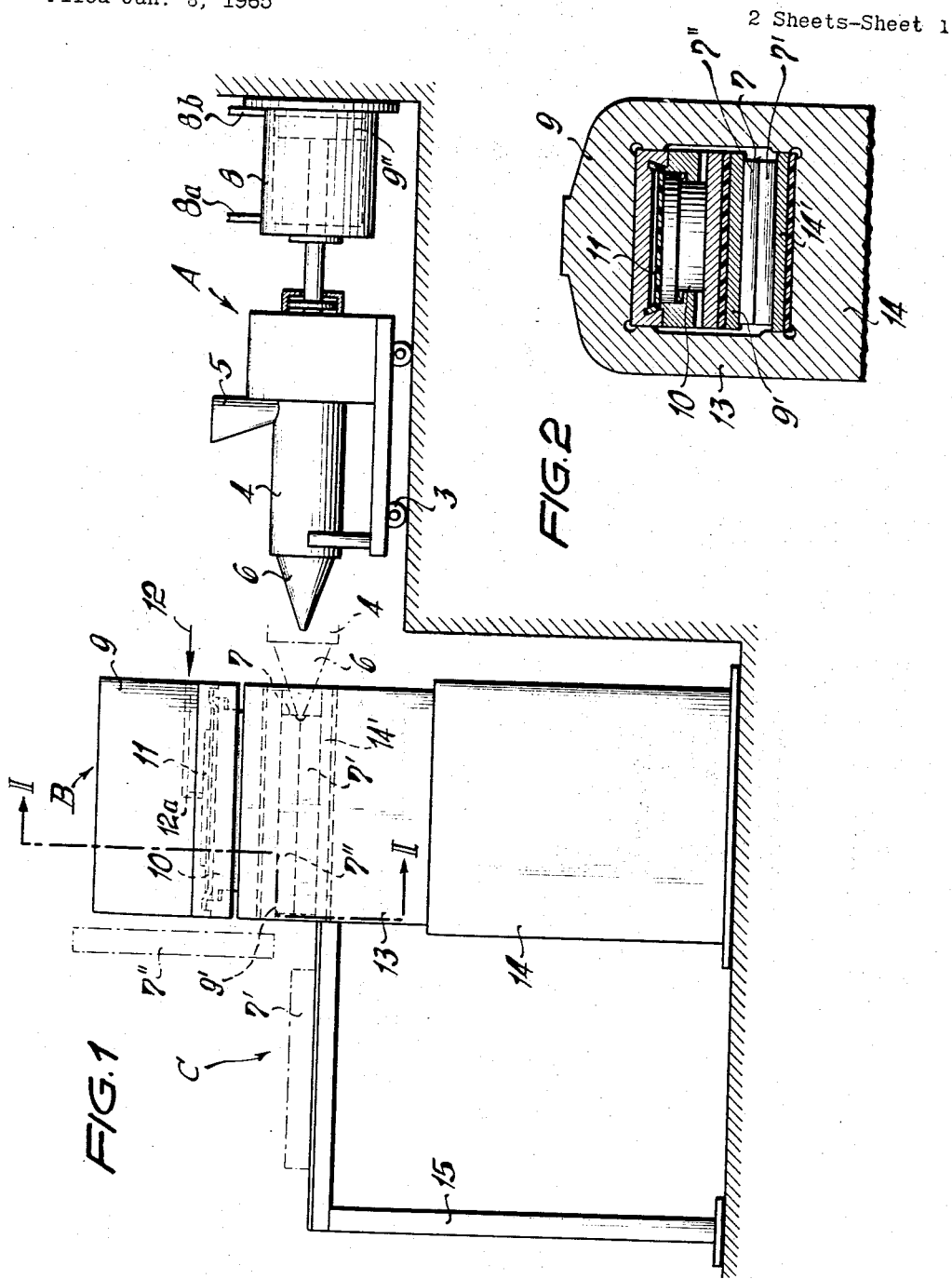

3,337,909
APPARATUS FOR PRODUCING RUBBER ARTICLES
Adolf Loges, Hannover, and Karl Huff, Ahlem, Hannover, Germany, assignors to Continental Gummi-Werke Aktiengesellschaft, Hannover, Germany
Filed Jan. 8, 1965, Ser. No. 454,759
Claims priority, application Germany, Jan. 11, 1964, C 31,860
14 Claims. (Cl. 18—4)

The present invention relates to an apparatus for producing rubber articles by injecting a preheated rubber mixture under elevated pressure into a multi-part heated vulcanizing mold. The employment of the injection molding method known from the processing of synthetic plastic materials for the production of molded articles of natural or synthetic rubber is relatively new. In view of the fact that in both instances the processes appear to be similar, the construction and arrangement of rubber injection molding machines have heretofore been selected according to the aspects and principles prevailing with injection molding machines for synthetic plastic material. The heretofore known devices for injection molding of rubber articles, therefore, were designed closely according to the practice for molding of synthetic plastic material, i.e., as compact machine units with interengaging functions.

However, whereas synthetic plastic materials are injected from a preheated cylinder into a cold mold and are caused to gell and solidify in said cold mold, the processing of rubber differs fundamentally therefrom in that the rubber mixture preheated to a maximum temperature passes by the injection operation into a still heated mold in which it tends to expand in view of the prevailing temperature differences. The reaction forces resulting therefrom bring about a course in the procedure which is different from that of injection molding of synthetic plastic material. On the other hand, the mold closing forces required in connection with the injection molding of rubber material are considerably higher than those occurring in connection with the injection molding of synthetic plastic material.

The heretofore known devices and machines for processing rubber mixtures which disregard the above-mentioned aspects therefore had to be designed rather strong all over, particularly also in view of the compact construction and over lapping ranges of function. It is for this reason that heretofore known machines for injection molding of rubber material are extremely heavy which fact influences the selection of the place where such machines can be mounted and furthermore causes increased costs and affects their economy.

It is, therefore, an object of the present invention to provide an apparatus for producing rubber articles by injection molding of rubber mixtures, which will overcome the above-mentioned drawbacks.

It is another object of this invention to provide an apparatus of the type set forth above, which will result in a considerable decrease in the weight of the device while taking into consideration the difference in the processing of rubber and rubber mixtures on one hand and of plastic synthetic materials on the other hand.

These and other objects and advantages of the invention will appear more clearly from the following specification in connection with the accompanying drawings, in which:

FIG. 1 is a diagrammatic representation of an apparatus according to the present invention for injection molding rubber articles.

FIG. 2 is a section taken along the line II—II of FIG. 1 and shows the structure of a press unit.

Figure 3:
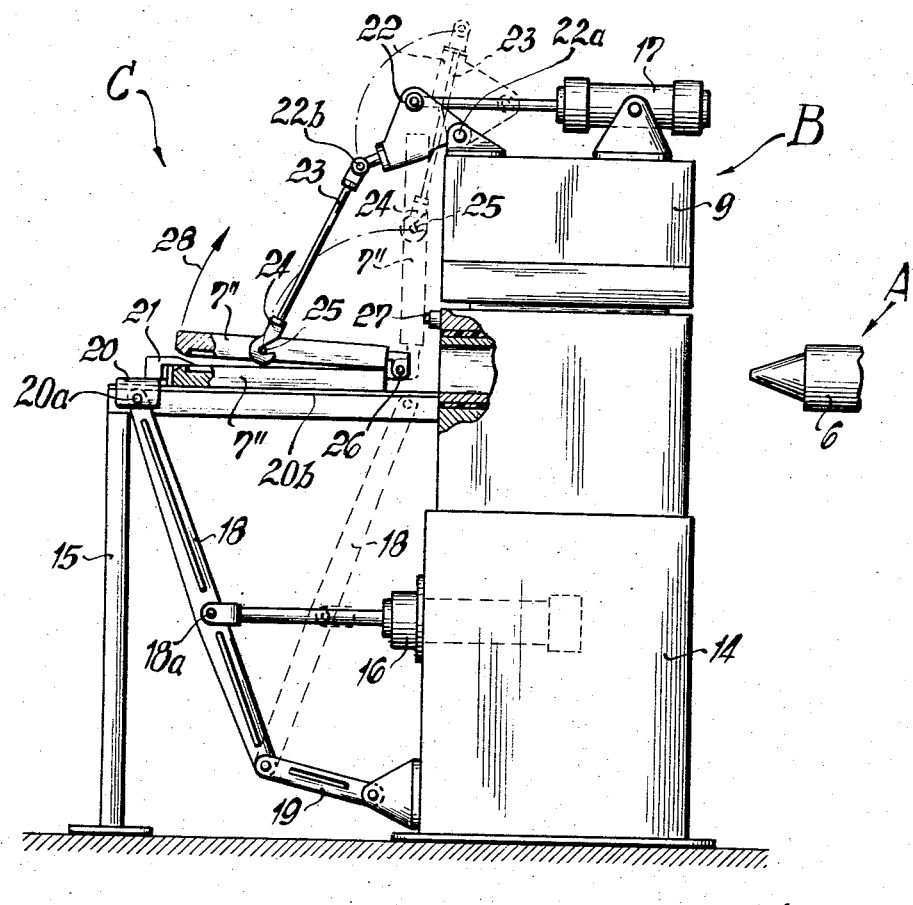
FIG. 3 illustrates a mold receiving and opening device in connection with an apparatus according to FIG. 1.

The present invention is characterized primarily in that a press unit for producing the closing forces for the vulcanizing mold is arranged separately from the injection unit and serves for exclusively absorbing the counter forces, while a device for receiving and opening the vulcanizing mold is arranged outside the range of operation of the press unit.

By splitting up the entire machine unit into functional units which are practically independent of each other, the present invention completely breaks with the concepts heretofore valid for the injection molding of rubber material, which concepts are inherent to the processing of synthetic plastic material. The present invention results in an injection molding apparatus in which the press unit within which the vulcanization takes place represents an independent unit in the form of a clamping yoke structure. All closing forces produced by this clamping yoke remain confined to the machine range closed in itself and the stresses caused by said closing forces are fully absorbed within this machine range. The dimensioning of the other units may, therefore, be effected independently of the design of the clamping yoke and without consideration of the magnitude of the occurring closing forces. Inasmuch as the closing forces produced in the press unit, which closing forces may amount to from 350,000 to 700,000 kilograms, will not produce any reaction forces in other machine ranges, the said closing forces or stresses produced thereby will in all conditions of operation be free from additional alternating stresses and consequently the machine units can be designed without compromise in conformity with their own functions. The entire apparatus according to the present invention has a surprisingly low weight and in particular the moving parts can be designed light and easily maneuverable. In addition to the reduced space and power requirement, an apparatus according to the present invention also has the advantage of light weight construction while the manufacturing costs are greatly reduced.

Referring now to the drawings in detail, the injection molding apparatus shown therein and intended exclusively for the manufacture of articles of rubber or rubber containing mixtures comprises an injection unit A, a press unit B and a mold receiving unit C, said units representing the main parts of the machine. The injection unit A is movable relative to the stationary machine units B and C as has been indicated diagrammatically in the drawing by rollers 3. At the rear end of the injection unit A there is provided a heated injection cylinder 4 with a charging funnel 5 for charging plastic rubber mixtures into cylinder 4. The front end of cylinder 4 is equipped with an injection nozzle 6 through which the preheated rubber mixture is injected into a vulcanizing mold 7. A stationary twochamber cylinder 8 is operatively connected to the injection unit for advancing the same in horizontal direction toward the vulcanizing mold and for withdrawing said injection unit from said mold into the starting position shown in the drawing. Reciprocably mounted in cylinder 8 is a double-acting piston 9" adapted to be acted upon by pressure fluid alternately conveyed through conduits 8a and 8b.

Press unit B is designed as clamping yoke with a press member or press platen 10 adapted to move upwardly and downwardly in a stationary crossarm 9. Press unit B serves for closing the divided mold 7 against the reaction forces which occur during the injection molding process and during the vulcanizing process. Press platen 10 forms the power conveying part of a diaphragm piston the flexible diaphragm 11 of which is clamped at its edges into crossarm 9. That side of diaphragm 11 which faces away from press platen 10 is adapted to be acted upon by pressure fluid admitted through conduit means 12a, said pressure fluid being introduced in the direction of the arrow 12.

According to the showing of FIG. 2, the clamping yoke is designed as a closed girder in the form of a box frame. Such a frame, composed of fixedly interconnected parts supporting each other against the effect of the produced mold closing forces, forms a tunnel-like or shell construction and is adapted to absorb all forces resulting from the clamping or closing of the vulcanizing mold. Crossarm 9 is combined with a base or lower member 14 by lateral walls 13 so as to form a closed clamping structure. Consequently, all stresses caused by the diaphragm piston 10, 11 remain limited to the press unit proper. The magnitude of the maximum closing force is therefore important only for the dimensioning of members 9, 13, and 14, whereas it may be disregarded for the design of the machine units A and C.

Any heretofore known customary heating units may be employed for the vulcanizing mold. For instance, according to FIG. 2, electrically or steam heated intermediate plates 9', 14' may be provided. The design of the heating devices per se is not of importance in connection with the present invention.

As will be seen from FIG. 2, vulcanizing mold 7 rests on the lower part 14 and prior to the start of the injection molding process is clamped fast by a downward movement of the press platen 10. According to the showing in the drawing, mold 7 is a two-part mold having a lower plate 7' and an upper plate 7", injection nozzle 6 being adapted to enter mold 7 along the dividing plane between plate 7' and plate 7" as has been indicated in dot-dash lines in FIG. 1.

Inasmuch as following the completion of a vulcanizing process, mold 7 is completely withdrawn from the press unit B, the stroke of the diaphragm piston 10, 11 may be extremely short. For practical purposes, strokes of from 2 to 4 millimeters are sufficient.

Adjacent that side of press unit B which faces away from injection unit A there is provided a mold receiving and opening device C. This device C in its simplest form is composed of a table-like member 15 onto which mold 7 may be pulled after press unit B has been opened. The pulling operation may be effected manually or mechanically and by upward tilting of upper plate 7".

In conformity with the arrangement shown by way of example in FIG. 3, the displacement and opening of the vulcanizing mold is effected by two double-acting cylinder piston systems 16, 17. Cylinder piston system 16 is fixedly arranged below table 15 and is adapted to act upon a two-arm lever 18 having its lowermost end pivotally connected to a tiltable auxiliary lever 19. The upper end of two-arm lever 18 is pivotally connected at 20a to an abutment 20 which in the manner of a frame embraces the vulcanizing mold. Abutment 20 is rectilinearly reciprocable in guiding means 20b on table 15 with regard to press unit B.

By correspondingly dimensioning the lever arms of lever 18, it will be appreciated that by alternately subjecting the cylinder piston system 16 to pressure fluid, abutment 20 with vulcanizing mold 7 will alternately move to its injection molding position in press unit B and to the discharge position on table 15 as shown in FIG. 3.

For purposes of facilitating the opening of mold 7', 7", table 15 has arranged thereon a wedge-shaped member 21 which is adapted by means of its edge to move into the dividing plane between mold plates 7' and 7" and to break these two parts apart by entering a notch opening toward the outside.

Cylinder piston system 17 intended for opening the vulcanizing mold and lifting upper plate 7" off lower plate 7' is pivotally connected to crossarm 9 of the upper part of press unit B. As will be evident from FIG. 3, cylinder piston system 17 is operatively connected to an angle lever 22 which has one leg pivotally connected at 22a to cross arm 9 and has another leg pivotally connected at 22b to a pullrod 23. The free end of pullrod 23 is provided with a hook 24 which is open toward the press unit B and serves for receiving a bolt 25 mounted on the adjacent side of upper plate 7" of the vulcanizing mold. While the drawing shows parts 22, 23, 24 and 25 only on one side of the device, it is to be understood that the same elements are also provided on the other side of the device inasmuch as a unilateral design of the said elements would cause a disadvantageous tilting moment.

As long as vulcanizing mold 7 is within press unit B, pullrods 23 are in freely downwardly suspended position in front of cross arm 9. When mold 7', 7" after opening of the press is moved out of the press unit by means of cylinder piston system 16, bolts 25 will during the course of this outward movement engage the open hooks 24. After the illustrated end position has been reached, in which the lower plate 7' is positively held down on table 15, cylinder piston system 17 becomes effective. As a result thereof, pullrods 23 will in view of a tilting movement of angle lever 22 lift upper plate 7" off lower plate 7' and will exert a pull along an incline. When both mold plates 7' and 7" are rotatably interconnected, for instance by an outer pivot joint 26, the said upward movement is converted into a tilting movement as indicated by the arrow 28. Advantageously, cross arm 9 is provided with a resilient abutment 27 for elastically stopping and supporting the upwardly tilted mold plate 7".

The alternate actuation of the two cylinder piston systems 16, 17 may be controlled manually or in conformity with each other and with the completion of the preceding working cycle may be controlled by limit switches in such a way that the pulling out of the vulcanizing mold 7 from press unit B, after diaphragm piston 10, 11 has moved upwardly, and the breaking open and opening of the mold is effected automatically without any manual operations.

As will be evident from the above, the arrangement of a receiving device for the vulcanizing mold outside the press unit meets the special requirement of rubber processing with regard to good accessibility and cleaning possibility of the mold following the completion of a vulcanization. Whereas molds employed in connection with the injection molding of synthetic plastic material may be employed without inspection intervals over a plurality of successive injection molding operations, a cleaning of a vulcanizing mold used for vulcanizing rubber articles is indispensable after each completed vulcanization. In contrast to the rigidly solidifying synthetic plastic materials, the relatively thin flowing rubber mixture fills in fine venting bores in the heated mold parts. If these bores are not cleaned for the next successive molding operation, faulty products will be unavoidable. Moreover, residues remaining in the mold may harden in a plurality of successive vulcanizing cycles to such an extent that they even destroy molds of high class steel. The arrangement according to the present invention makes the vulcanizing mold easily accessible as to all parts so that any deposit can safely be found and removed.

The separation of the press unit not only from the injection unit but also from the discharging range of the vulcanizing mold according to the present invention has an advantageous effect upon the design of the press unit. Inasmuch as the vulcanizing mold is opened and discharged outside the press unit and is also prepared for the next cycle outside the press unit, the movements of the clamping yoke for producing and relieving the closing forces can be confined to extremely small strokes in the magnitude of a few millimeters. The construction and the movable mechanisms of the press unit can, therefore, be designed extremely simple and for easy inspection and make possible the employment of a short stroke pressure fluid operable diaphragm piston. This feature is highly advantageous with regard to an immediate response and reliable seal.

As will also be evident from the above, the present invention assures an undisturbed and automatic operation of all working functions.

It is, of course, to be understood that the present invention is, by no means, limited to the particular arrangements shown in the drawings but also comprises any modifications within the scope of the appended claims.

What we claim is:

1. For use in connection with an injection unit adapted to inject pre-heated rubber material, an apparatus which comprises: a press unit adapted to receive a multi-part mold and including means for closing a mold therein and to absorb the reaction forces occurring during the closing of said mold and the injection of material into such mold, said press unit being arranged separately and independently of said injection unit, and a device arranged outside the range of operation of said press unit and separate from said injection unit for receiving a vulcanizing mold released by said press unit and removing it therefrom.

2. For use in connection with an injection unit adapted to inject pre-heated rubber material, an apparatus which comprises: a press unit adapted to receive a multi-part mold and including means for closing a mold therein and to absorb the reaction forces occurring during the closing of said mold and the injection of material into such mold, said press unit being arranged separately and independently of said injection unit, said press unit including a yoke structure and a pressing member reciprocable in said yoke structure in a direction substantially at a right angle with regard to the direction of movement of said injection unit relative to said press unit, and a device arranged outside the range of operation of said press unit and separate from said injection unit for receiving a vulcanized mold released by said press unit and removing it therefrom.

3. An arrangement according to claim 2, in which said yoke structure is formed by a frame closed in itself and provided with a passage for receiving and releasing a vulcanizing mold.

4. An arrangement according to claim 2, in which said yoke structure is formed by a frame composed of firmly interconnected members supporting each other so as to be able to absorb the stresses occurring by the closing forces employed for closing a mold in said press unit.

5. For use in connection with an injection unit adapted to inject pre-heated rubber material, an apparatus which comprises: a press unit adapted to receive a multi-part mold and including means for closing a mold therein and to absorb the reaction forces occurring during the closing of said mold and the injection of material into such mold, said press unit being arranged separately and independently of said injection unit, said press unit ncludng a yoke structure and a pressng member reciprocable in said yoke structure over a limited distance so as to be able to perform a maximum stroke of 10 millimeters, said pressing member being reciprocable in a direction substantially at a right angle with regard to the direction of movement of said injection unit relative to said press unit, and a device arranged outside the range of operation of said press unit and separate from said injection unit for receving a vulcanzing mold released by said press unit and removing it therefrom.

6. For use in connection wtih an injection unit adapted to inject pre-heated rubber material, an apparatus which comprises: a press unit adapted to receive a multi-part mold and including means for closing a mold therein and to absorb the reaction forces occurring during the closing of said mold and the injection of material into such mold, said press unit being arranged separately and independently of said injection unit, said press unit including a yoke structure and a pressing member reciprocable in said yoke structure in a direction substantially at a right angle with regard to the direction of movement of said injection unit relative to said press unit, fluid operable diaphragm piston means operatively connected to said pressing member for actuating the same, and a device arranged outside the range of operation of said press unit and separate from said injection unit for receiving a vulcanizing mold released by said press unit and removing it therefrom.

7. An apparatus according to claim 2, in which said device outside the range of operation of said press unit includes means for withdrawing a mold from said press unit and also including guiding means for guiding such mold from said press unit out of the range thereof, said guiding means being located on opposite sides of the path over which such mold is moved when being withdrawn from said press unit.

8. An arrangement according to claim 7, in which the length of said guiding means corresponds at least to the length of the adjacent sides of the respective vulcanizing mold.

9. An arrangement according to claim 7, which includes abutment means arranged for positive engagement with a vulcanizing mold and slidably engaging said guiding means.

10. An apparatus according to claim 2, in which said device outside the range of operation of said press unit includes withdrawing means for withdrawing a mold from said press unit and also including guiding means for guiding such mold out of and into the range of said press unit, said withdrawing means comprising abutment means for positive engagement with a vulcanizing mold to be inserted into and to be withdrawn from said press unit, two-arm lever means pivotally connected to said abutment means, and pivot means floatingly tiltably engaging said lever means.

11. An arrangement according to claim 10, which includes double-acting cylinder piston means operatively connected to said pivot means for selectively moving the same in one and the opposite direction.

12. An apparatus according to claim 10, in which said two-arm lever means has one end thereof pivotally connected to said abutment means and has first pivot means arranged at the other end of said two-arm lever means for tilting the latter thereabout, second pivot means being arranged intermediate said ends of said two-arm lever means and forming a floating tilting point for said two-arm lever means, and fluid operable cylinder piston means operatively connected to said second pivot means for moving the same selectively in one and the opposite direction.

13. An arrangement according to claim 12, in which said second pivot means and the end position of said two-arm lever means is unevenly spaced from the ends of said two-arm lever means.

14. For use in connection with an injection unit adapted to inject pre-heated rubber material, an apparatus which comprises: a press unit adapted to receive a multi-part mold and including means for closing a mold therein and to absorb the reaction forces occurring during the closing of said mold and the injection of material into such mold, said press unit being arranged separately and independently of said injection unit, a device arranged outside the range of operation of said press unit and separate from said injection unit for receiving a vulcanizing mold released by said press unit and moving the same out of said press unit, opening means arranged above said device and including auxiliary lever means pivotally connected to said press unit and also including fluid operable cylinder piston means operatively connected to said auxiliary lever means, and further including hook equipped pull-rod means pivotally connected to said auxiliary lever means and operable in response to a mold having been moved out by said device from said press unit for engaging a part of such multi-part mold and to open the same.

References Cited

UNITED STATES PATENTS

| | | | |
|---|---|---|---|
| 1,674,387 | 6/1928 | Campbell | 18—4 X |
| 1,777,310 | 10/1930 | Hopkinson. | |
| 2,363,779 | 11/1944 | Duffy et al. | |
| 2,386,641 | 10/1945 | Trockle et al. | 18—16 |
| 2,442,607 | 6/1948 | Leguillin et al. | 18—30 |
| 2,561,021 | 7/1951 | Groth | 18—30 |
| 2,869,173 | 1/1959 | Van Hartesveldt et al. | 18—16 |
| 2,993,231 | 7/1961 | Yahn et al. | 18—16 |
| 3,006,306 | 10/1961 | Pfeiffer et al. | |
| 3,091,810 | 6/1963 | Turner | 18—30 |
| 3,099,061 | 7/1963 | Marchioli et al. | 18—16 X |
| 3,189,945 | 6/1965 | Strauss | 18—30 |

WILLIAM J. STEPHENSON, *Primary Examiner.*